Feb. 14, 1933.  G. L. CHAMBERLAIN  1,897,630
ELECTRICAL CONNECTION
Filed Aug. 14, 1929
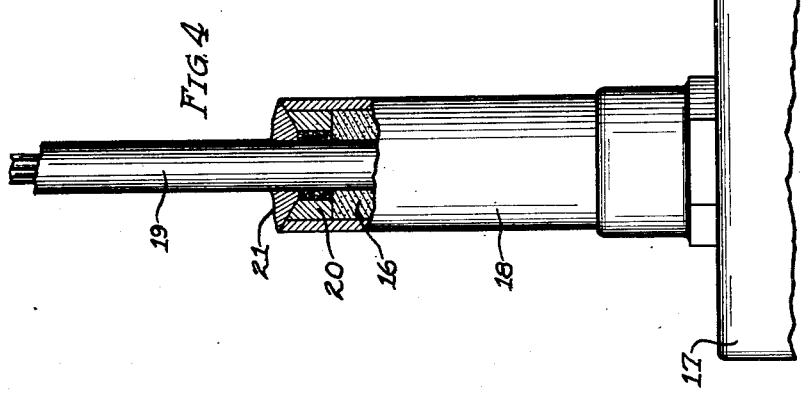
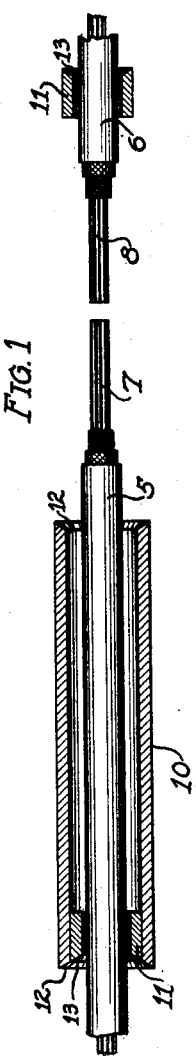
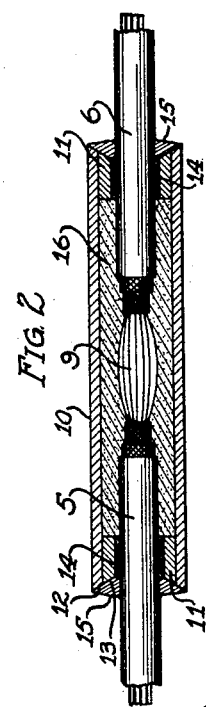
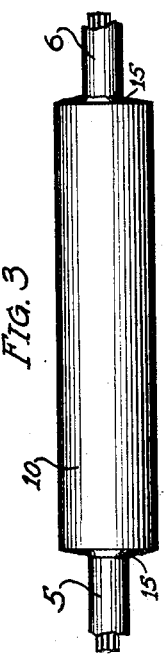
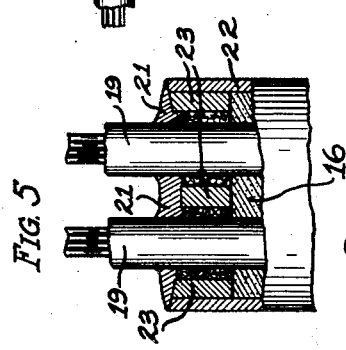
WITNESSES:
R. A. Larsson
F. E. Appleton
INVENTOR:
GEORGE L. CHAMBERLAIN,
By Joshua R. H. Potts
HIS ATTORNEY.

Patented Feb. 14, 1933

1,897,630

UNITED STATES PATENT OFFICE

GEORGE L. CHAMBERLAIN, OF CHICAGO, ILLINOIS

ELECTRICAL CONNECTION

Application filed August 14, 1929. Serial No. 385,953.

This invention relates to electrical connections, and more particularly to means for effecting a permanent connection between two conducting wires or cables, as by a spliced joint or the like, or effecting a permanent connection between a conductor and an instrument, such as a feed wire and a transformer or other appliance.

In making a spliced connection between the ends of two electrical cables the meeting end portions of the conducting wires are usually twisted together and soldered or otherwise securely fastened, after which a tubular member is sleeved over the spliced end portions of the two cable sections and sealed at its ends, said tubular member being composed of lead or metal alloy similar to the external casing of the cable and the space therein surrounding the cable joint being filled with an insulating compound. The end portions of this tubular member or protective sheath are usually secured to the adjacent portions of the leaden covering of the cable sections by a wiped joint such as is ordinarily made in effecting the connection between two lead pipe sections. This method of attaching the tubular sheathing to the cable sections obviously requires considerable skill and is quite expensive on account of the present high cost of that class of labor. Furthermore, this type of joint is better accomplished when the parts are disposed horizontally. So, too, it is difficult to apply the insulating compound, which is usually poured into the tubular sheathing through a minute aperture in the side wall thereof, after the ends of the tube have been sealed, and the only vent for said tube being a small aperture in the side wall thereof similar to that through which the insulating compound is poured into the tube. Or else a slot is provided for the purpose in the tube. In either case, the said openings have to be sealed after the insulating compound is placed in the tube, and this naturally adds to the labor and expense.

The present invention has for its objects to avoid all the disadvantages above noted and to provide a simple and practical means for effecting the connection between the tubular sheathing and the cable covering, to facilitate placing the insulating compound within the tube, and to attain certain other advantages which will hereinafter more fully appear.

The invention consists in the novel structural elements, and in the method of applying and utilizing the same as will hereinafter be more fully described and set forth in the appended claims.

In the accompanying drawing, forming part of this specification,

Fig. 1 is a view partly in longitudinal section and partly in side elevation, showing the several parts detached but arranged preparatory to effecting a spliced cable connection;

Fig. 2 is a longitudinal section through the finished connection;

Fig. 3 is a side elevation of the finished connection;

Fig. 4 is a view partly in elevation and partly in section, illustrating a modification of the invention; and Fig. 5 illustrates a further modification of the invention.

Referring now to the drawing, the numerals 5 and 6 designate the meeting end portions of two electrical cables, whose conducting wires 7 and 8 (see Fig. 1) are uncovered where they are to be spliced together, as at 9 (see Fig. 2).

Before the meeting end portions 7 and 8 of the conducting wires of the two cable sections 5 and 6 are joined together a section of tubing 10, preferably composed of lead, is slipped over one of the cable sections, for example, the section 5 as shown. This tubular member is of interior diameter somewhat larger than the diameter of the spliced joint 9 and that of the lead covering of the cable. Also sleeved on the cable section 5 is a bushing 11, preferably of lead or some material which may be soldered or sweated to the cable covering and the tubular member 10. Preferably, the opening of said bushing is just a little larger than the diameter of the cable covering, and it is of an over all diameter to fit snugly within the bore of the tube 10, and, preferably, said bushing is tapered circumferentially but just sufficiently to enter easily and seat in the end portion of said tube 10, which latter may be reamed according to the taper of the bushing. It is further preferable to countersink the outer end portions of said tube and bushing, as at 12 and 13, respectively (see Fig. 1).

After the end portions 7 and 8 of the conducting wires have been spliced, as at 9, the tube 10 is sleeved equally over the joint, as shown in Fig. 2, with one of the bushings 11 located in the tube, and a suitable packing 14 is forced in between the bushing 11 and the covering of the cable section 5. Solder 15 is then applied to the end portions of the tube and bushing and the adjacent portion of the covering of the cable 5. To accomplish this, the assembly is stood on end and the molten solder is run into the pocket provided by the countersink end portions 12 and 13, respectively, of the said tube and bushing. After this end portion of the tube 10 has been sealed and securely attached to the cable the other bushing 11, which has been sleeved on the cable section 6 but detached from the tube 10, may be readily inserted in the opposite end of the tube and said end portion sealed and securely attached to said cable section. Before the sealing and attaching of the latter end portion of the tube 10 to the cable 6 is effected, however, the insulating compound 16 is preferably poured into the tube from the then open end thereof, leaving room just sufficient to insert bushing 11.

While the invention is particularly well adaptable to the connecting of two cable sections, it is also applicable to effecting a so-called permanent connection between a cable and an electrical appliance, an example of which is illustrated in Fig. 4 of the drawing. In this modification the reference numeral 17 designates an ordinary transformer box or the like, from which extends the tube 18, through which latter the cable 19 communicates with the interior of the box and is connected to the primary or secondary coil of the transformer, as the case may be. In the outer end portion of the tubular extension 18 is placed a bushing 20, similar to the hereinbefore described bushing 11, said tubular extension 18 and bushing 20 being secured to the cable 19 by the body of solder 21. In a structure of this character the tubular extension 18 may or may not be filled with the insulating compound 16, depending upon the character of the connection which is made between the cable 19 and the internal part of the appliance.

The invention is also applicable to a multiple cable connection. That is to say, two or more cables may be connected through one tube or sheath 22, the only difference between this and the other herein described structures being that the bushing 23 is provided with a corresponding plurality of openings instead of a single opening for the passage of the several cables therethrough.

Obviously, in addition to affording strength and durability and neatness in appearance, the jointure effected according to the present invention is also water-tight, and it is capable of considerable modification other than that herein shown and described, without in the least departing from the spirit and scope of the invention as defined by the appended claims. The invention, therefore, is not limited to the specific construction and arrangement shown in the accompanying drawing.

Having thus described my invention, what I claim as new and desire to secure by Letters Patent is:

1. In an electrical connection, the combination of a cable section, a tubular external connector member, a bushing fitted originally slidable on said cable section and inserted with relatively tight fit in the end portion of said tubular connector member, the outer end portions of said tubular connector member and bushing being countersunk to provide an annular flared pocket about the cable section, and a body of solder applied in said annular pocket whereby to join said tubular sheathing member and bushing and secure them to the adjacent circumferential portion of the cable section.

2. In an electrical connection, the combination of a cable section, a tubular external connector member surrounding the cable section in spaced relation thereto throughout, a bushing fitted originally slidable on said cable section and inserted with relatively tight fit in the end portion of said tubular connector member, the outer end portion of said bushing receding from the adjacent end of the tubular connector member to produce an annular pocket about the cable section, and a body of solder applied in said annular pocket whereby to join said tubular connector member and bushing and secure them to the adjacent circumferential portion of the cable section with hermetically sealed and retentive effect.

In testimony whereof I have signed my name to this specification.

GEORGE L. CHAMBERLAIN.